(12) United States Patent
Malyutin et al.

(10) Patent No.: US 9,569,809 B2
(45) Date of Patent: Feb. 14, 2017

(54) PATTERN MATCHING METHOD AND ELECTRONIC DEVICE THEREFOR

(71) Applicant: Samsung Electronics Co., Ltd., Gyeonggi-do (KR)

(72) Inventors: Mikhail Malyutin, Vyshneve (UA); Maksym Antipov, Kyiv (UA)

(73) Assignee: Samsung Electronics Co., Ltd., Suwon-si (KR)

(*) Notice: Subject to any disclaimer, the term of this patent is extended or adjusted under 35 U.S.C. 154(b) by 131 days.

(21) Appl. No.: 14/329,584

(22) Filed: Jul. 11, 2014

(65) Prior Publication Data

US 2015/0016662 A1  Jan. 15, 2015

(30) Foreign Application Priority Data

Jul. 12, 2013  (KR) .................. 10-2013-0082242

(51) Int. Cl.
| | |
|---|---|
| G06K 9/00 | (2006.01) |
| G06T 1/00 | (2006.01) |
| G06K 9/44 | (2006.01) |
| G06K 9/62 | (2006.01) |

(52) U.S. Cl.
CPC ............... *G06T 1/0021* (2013.01); *G06K 9/44* (2013.01); *G06K 9/6202* (2013.01)

(58) Field of Classification Search
None
See application file for complete search history.

(56) References Cited

U.S. PATENT DOCUMENTS

| | | | |
|---|---|---|---|
| 2008/0100709 A1* | 5/2008 | Furukawa | ............ 348/169 |
| 2011/0170133 A1* | 7/2011 | Kurilin | ...... G06K 15/1889 358/1.15 |
| 2014/0279933 A1* | 9/2014 | Blasko | ...... G06F 17/30011 707/687 |

* cited by examiner

*Primary Examiner* — Atiba O Fitzpatrick

(57) ABSTRACT

A method and apparatus verify whether a pattern extracted from an image or a video frame is identical to an original pattern in an electronic device. The method includes extracting a pattern and converting the extracted pattern into a first pattern of a binarized grid type, verifying pixel information of the first pattern, and determining whether the first pattern is identical to an original pattern in consideration of a similar degree between the pixel information of the first pattern and pixel information of the original pattern.

18 Claims, 15 Drawing Sheets

PATTERN MATCHING METHOD AND ELECTRONIC DEVICE THEREFOR

PRIORITY

The present application is related to and claims the benefit under 35 U.S.C. §119(a) of a Korean patent application filed in the Korean Intellectual Property Office on Jul. 12, 2013 and assigned Serial No. 10-2013-0082242, the entire disclosure of which is hereby incorporated by reference.

TECHNICAL FIELD

The present disclosure relates to a method for pattern matching and an electronic device therefor.

BACKGROUND

Each of electronic devices, which has become necessities of modern people due to ease in carrying it, has been developed into each of multimedia devices which provides various services such as a voice and video communication service, an information input and output service, and a data transmission and reception service.

Recently, as copy and transmission technologies of the electronic devices have been sharply developed, a problem of an illegal copy of digital contents has been resurfaced.

In order to protect a copyright of digital data, there is a digital watermarking technology for inserting secret information such as copyright information into various digital data such as images or videos. That is, original source and information of digital data may be tracked by inserting pictures or texts into the digital data.

Therefore, it is needed to provide a method and apparatus for matching a watermark inserted into digital data with an original watermark to extract the watermark inserted into the digital data and certify ownership of the digital data.

SUMMARY

To address the above-discussed deficiencies, it is a primary object to provide a method and apparatus for matching patterns in an electronic device.

Another aspect of the present disclosure is to provide a method and apparatus for verifying whether a pattern extracted from an image or a video frame is identical to an original pattern in an electronic device.

Another aspect of the present disclosure is to provide a method and apparatus for converting an extracted pattern into a pattern of a binarized grid type in an electronic device.

Another aspect of the present disclosure is to provide a method and apparatus for verifying whether to rotate an extracted pattern in consideration of a position determination element in the extracted pattern in an electronic device.

Another aspect of the present disclosure is to provide a method and apparatus for rotating a pattern in which there is no position determination element and determining whether the rotated pattern is identical to an original pattern in an electronic device.

In accordance with an aspect of the present disclosure, a pattern matching method of an electronic device is provided. The pattern matching method includes extracting a pattern and converting the extracted pattern into a first pattern of a binarized grid type, verifying pixel information of the first pattern, and determining whether the first pattern is identical to an original pattern in consideration of a similar degree between the pixel information of the first pattern and pixel information of the original pattern.

In accordance with another aspect of the present disclosure, an electronic device is provided. The electronic device includes at least one processor and at least one memory, wherein at least the one processor extracts a pattern, converts the extracted pattern into a first pattern of a binarized grid type, verifies pixel information of the first pattern, and determines whether the first pattern is identical to an original pattern in consideration of a similar degree between the pixel information of the first pattern and pixel information of the original pattern.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6G, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Example embodiments of the present disclosure will be described herein below with reference to the accompanying drawings. In the following description, well-known functions or constructions are not described in detail since they would obscure the disclosure in unnecessary detail.

Hereinafter, a description will be given for a method and apparatus for verifying whether a pattern extracted from an image or a video frame is identical to an original pattern in an electronic device.

Hereinafter, the electronic device may be any one of a mobile communication terminal, a Personal Digital Assistant (PDA), a laptop, a smart phone, a netbook, a TeleVision (TV), a Mobile Internet Device (MID), a Ultra Mobile Personal Computer (UMPC), a tablet PC, a navigation device, a digital refrigerator, a digital watch, and a Moving Picture Experts Group (MPEG) layer 3 (MP3) player.

Figure 1:
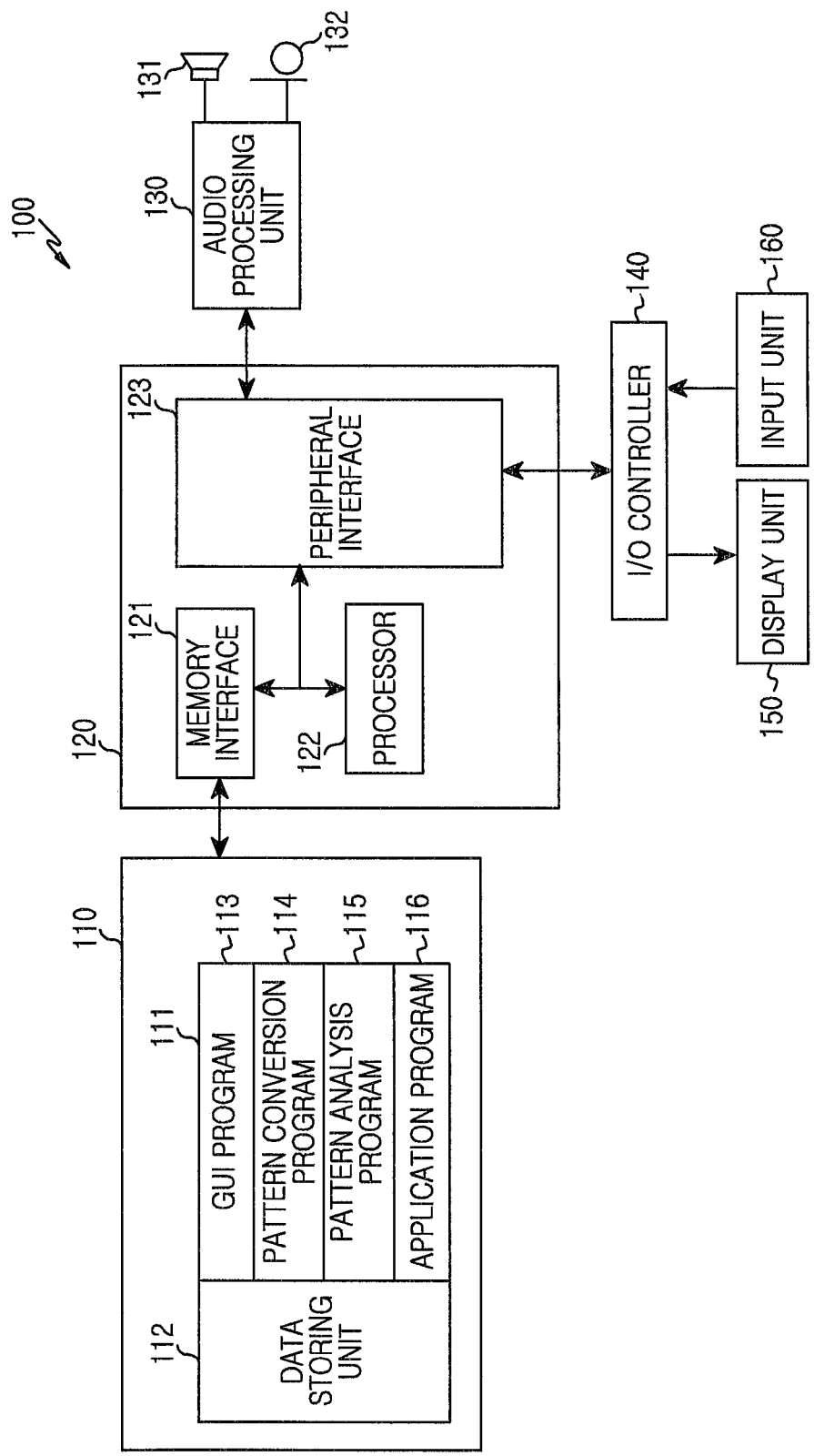
FIG. 1 is a block diagram illustrating configuration of an electronic device according to one embodiment of the present disclosure.

FIG. 1 is a block diagram illustrating configuration of an electronic device according to one embodiment of the present disclosure.

As shown in FIG. 1, the electronic device denoted by 100 may include a memory 110, a processor unit 120, an audio processing unit 130, an Input/Output (I/O) controller 140, a display unit 150, and an input unit 160. Herein, the memory 110 may be a plurality of memories.

A description will be given for respective components as follows.

The memory 110 may include a program storing unit 111 for storing programs for controlling operations of the electronic device 100 and a data storing unit 112 for storing data generated while the programs are executed. The program storing unit 111 includes a Graphic User Interface (GUI) program 113, a pattern conversion program 114, a pattern analysis program 115, and at least one application program 116. Herein, the programs included in the program storing unit 111 may be expressed in an instruction set as a set of instructions.

The GUI program 113 includes at least one software component for providing a UI as graphics on the display unit 150. For example, the GUI program 113 controls the display unit 150 to display information of an application program executed by the processor 122.

Figure 5A:
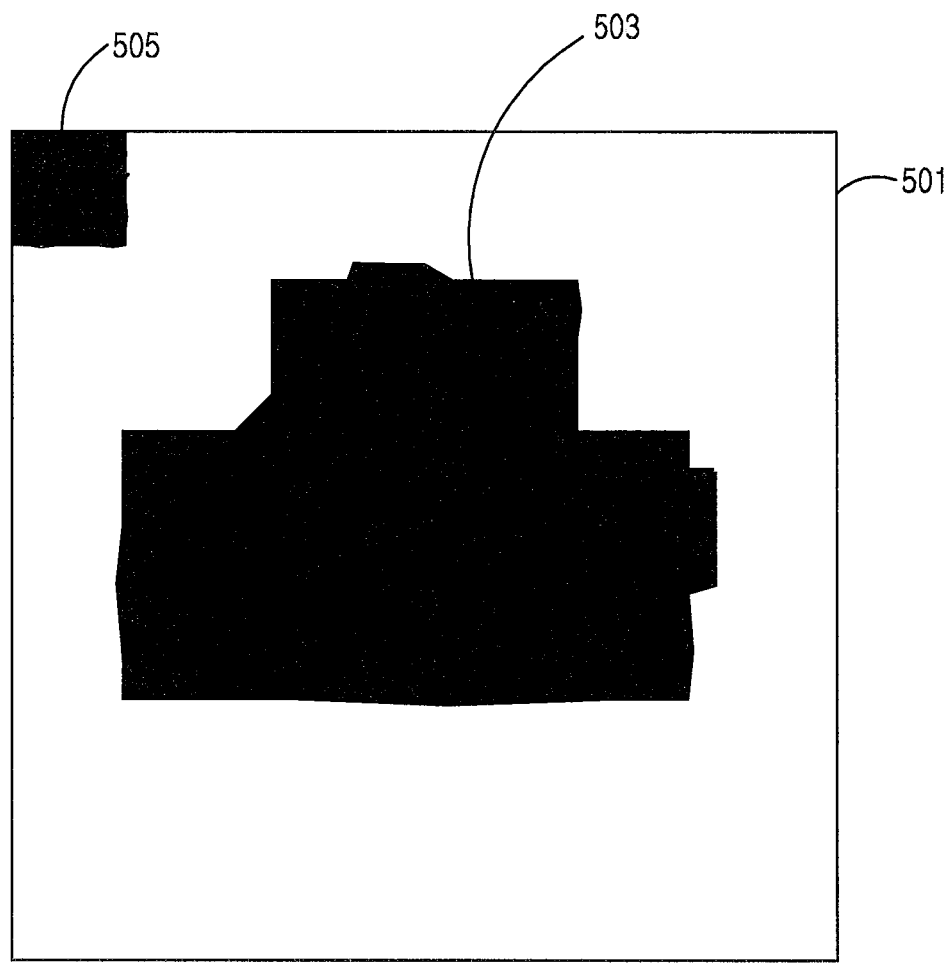
FIGS. 5A to 5D illustrate patterns, each of them including a position determination element in an electronic device according to one embodiment of the present disclosure.
Figure 5B:
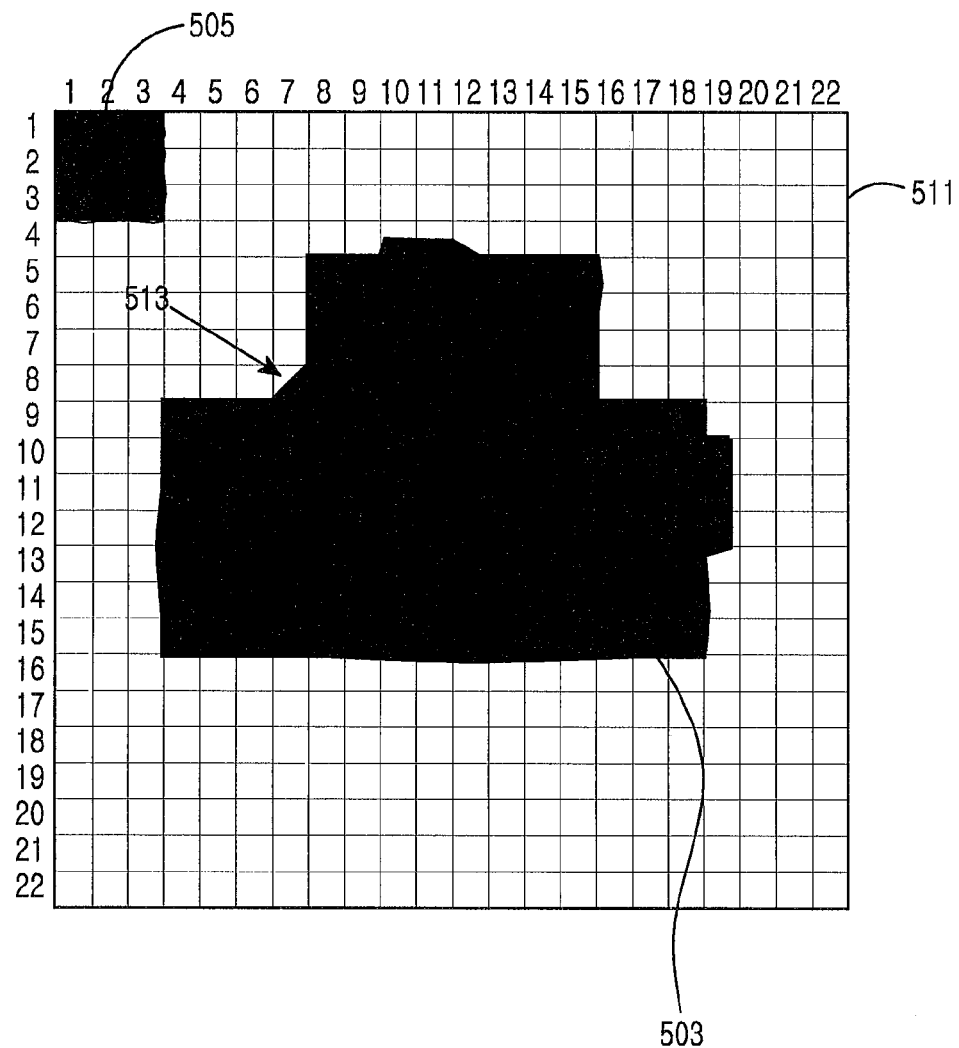
Figure 5C:
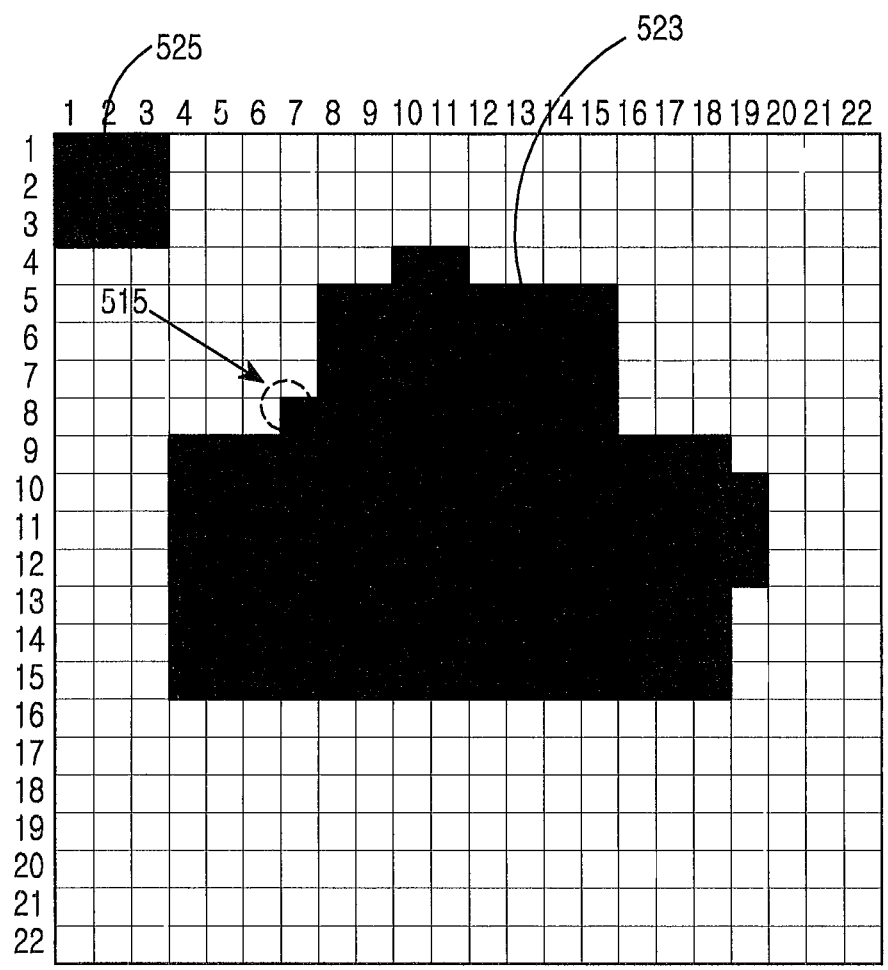
Figure 5D:
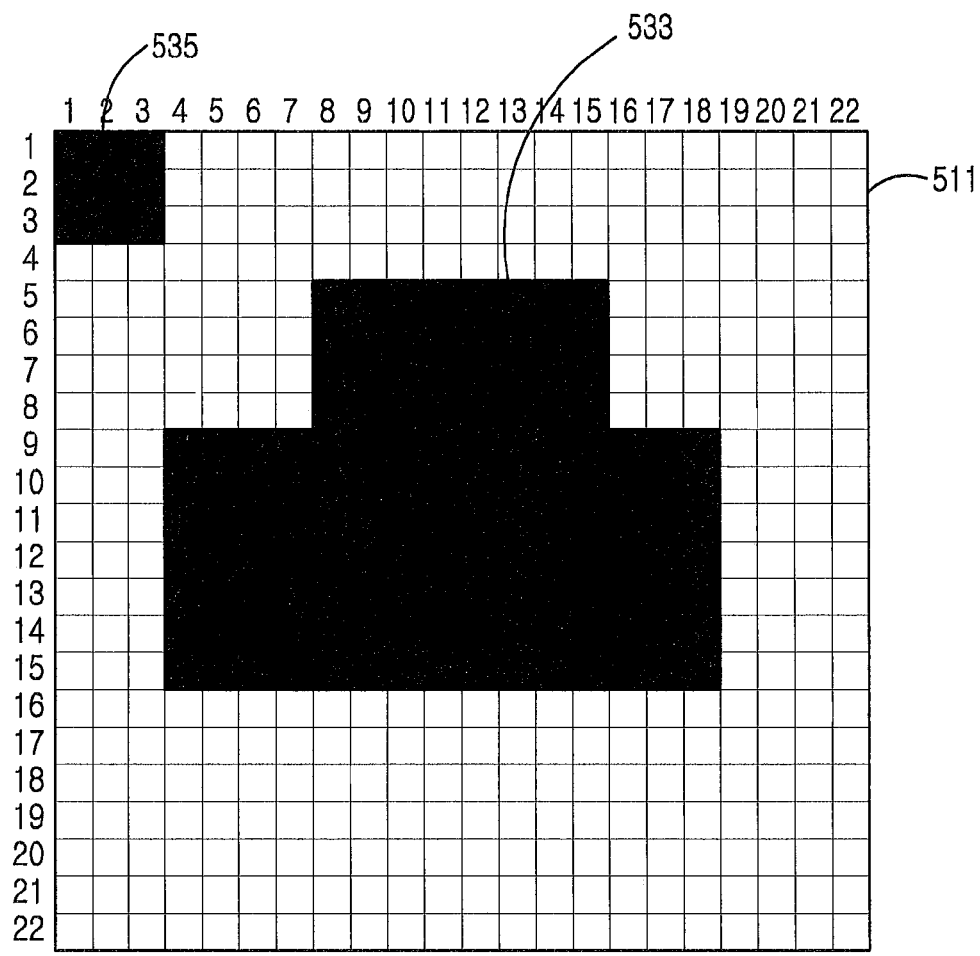

The pattern conversion program 114 includes at least one software program for converting an extracted pattern into a pattern of a binarized grid type. For example, as shown in FIG. 5B, the pattern conversion program 114 applies a square grid format 511 to extracted patterns 503 and 505. Herein, sizes of grids, the number of the grids, and arrangement of the grids included in the square grid format 511 may be preset by the electronic device 100 or be set by a user of the electronic device. Thereafter, as shown in FIG. 5C, the pattern conversion program 114 converts the extracted patterns 503 and 505 into first patterns 523 and 525 of a binarized grid type, respectively in consideration of sizes of the patterns 503 and 505 included in respective grids. For one example, as shown in FIG. 5B, when the extracted pattern 503 includes 50% or more of a grid 513, the pattern conversion program 114 may convert, as shown in FIG. 5C, a color of the grid 513 into the black color of a grid 515. For another example, when each of the extracted patterns 503 and 505 does not include 50% or more of a specific grid, the pattern conversion program 114 may convert a color of the corresponding grid into the white color.

Figure 3:
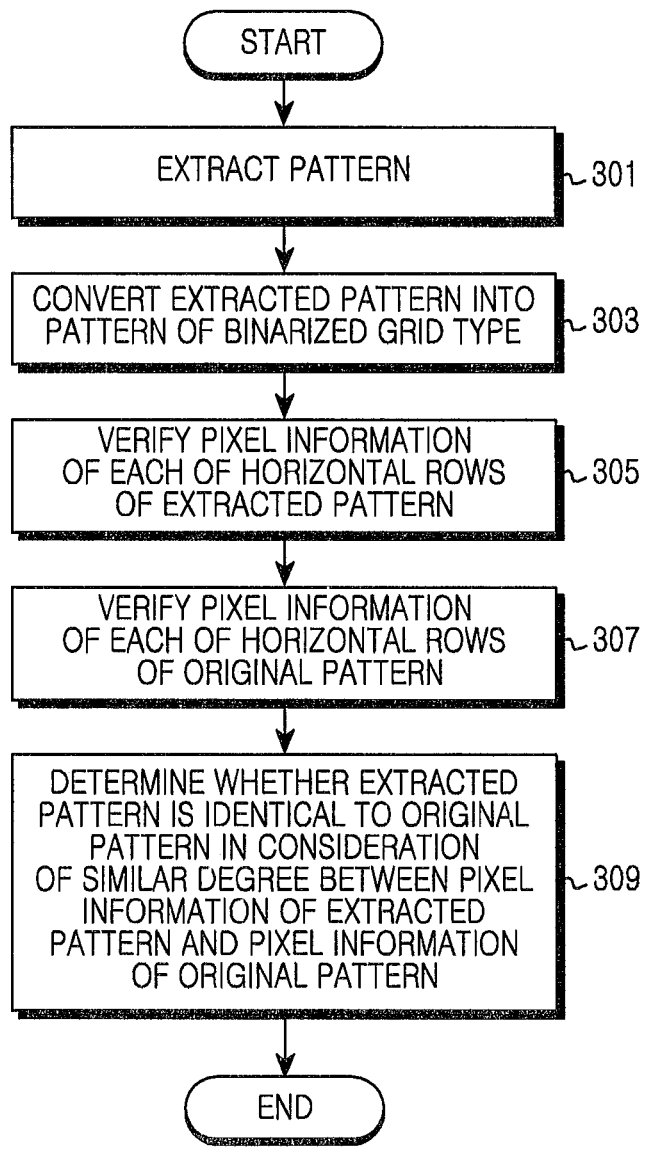
FIG. 3 is a flowchart illustrating a process of verifying whether an extracted pattern is identical to an original pattern in an electronic device according to one embodiment of the present disclosure.

The pattern analysis program 115 includes at least one software component for verifying pixel information about the pattern converted by the pattern conversion program 114. Herein, the pixel information may include color information of pixels, the number of the pixels, and arrangement information of the pixels. For example, the pattern analysis program 115 may include, as shown in FIG. 5C, 3 black pixels and 19 white pixels which are pixel information about a first horizontal row of the first pattern 525. Also, the pattern analysis program 115 may include 3 white pixels, 15 black pixels, and 4 white pixels which are pixel information about a $9^{th}$ horizontal row of the first pattern 523. That is, the pattern analysis program 115 may also verify pixel information including a sequence of pixels included in each of horizontal rows as well as the number of the pixels included in each of the horizontal rows. Also, the pattern analysis program 115 may also express pixel information of each of horizontal rows as a descriptor structure. Herein, the descriptor structure may include and express "<a color of a first pixel of a column (or row)>;0;[<a position of a pixel whose color is changed>;]<the number of pixels of a column (or row)><a delimiter>". Herein, it is assumed that the black color is 1 and the white color is 0. For example, the pattern analysis program 115 may express pixels information of the first horizontal row of the first pattern 525 and pixel information of the $9^{th}$ horizontal row of the first pattern 523 as a descriptor structure such as "1;0;4;22|0;0;4;19;22".

Also, the pattern analysis program 115 includes at least one software component for determining whether an extracted pattern is identical to an original pattern in consideration of a similar degree between pixels information of the extracted pattern and pixel information of the original pattern. For example, the pattern analysis program 115 may verify a similar degree by comparing the number of black pixels of each of horizontal rows in pixel information of the first patterns 523 and 525 with the number of black pixels of each of horizontal rows in pixel information of original patterns 533 and 535. Herein, the pattern analysis program 115 may also verify a similar degree by comparing pixel information about the reference number of horizontal rows among all horizontal rows of the first patterns 523 and 525 with pixel information about the reference number of horizontal rows among all horizontal rows of the original patterns 533 and 535. Thereafter, when a similar degree between pixel information of the extracted pattern and pixel information of the original pattern is greater than or equal to a reference similar degree, the pattern analysis program 115 may recognize that the extracted pattern is identical to the original pattern. Or, when the similar degree between the pixel information of the extracted pattern and the pixel information of the original pattern is less than the reference similar degree, the pattern analysis program 115 may recognize that the extracted pattern is not identical to the original pattern.

The application program 116 includes a software component for at least one application program installed in the electronic device 100.

The processor unit 120 may include a memory interface 121, at least one processor 122, and a peripheral interface 123. Herein, the memory interface 121, the at least one processor 122, and the peripheral interface 123 which are included in the processor unit 120 may be integrated in at least one Integrated Circuit (IC) or be separately implemented.

The memory interface 121 controls that a component like the processor 122 or the peripheral interface 123 accesses the memory 110.

The peripheral interface 123 controls connection among an I/O peripheral of the electronic device 100, the processor 122, and the memory interface 121.

Figure 2:
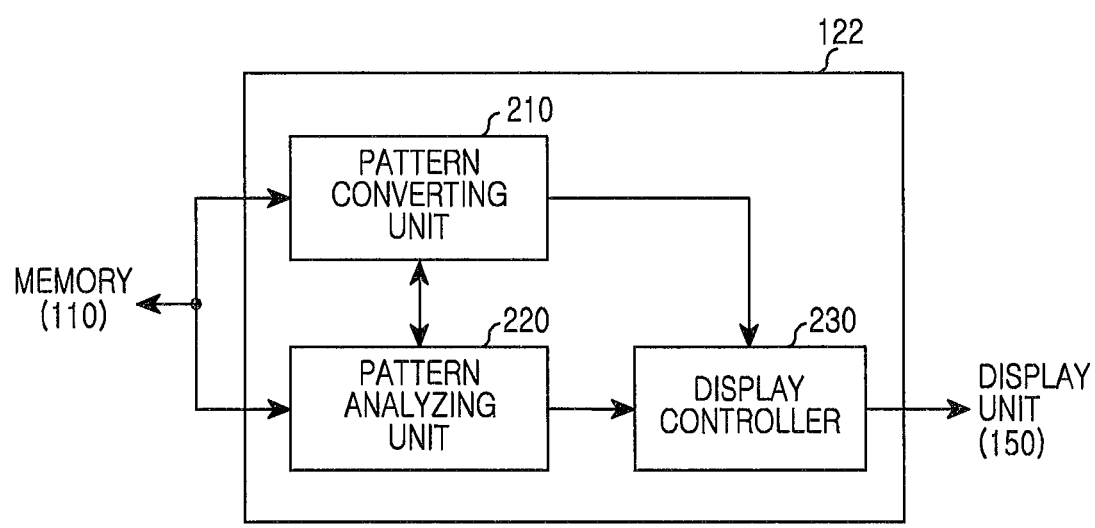
FIG. 2 is a block diagram illustrating detailed configuration of a processor according to one embodiment of the present disclosure.

The processor 122 provides a variety of multimedia services using at least one software program. Also, the processor 122 executes at least one program stored in the memory 110 and provides a service according to the corresponding program. For example, as shown in FIG. 2, the processor 122 may be configured to execute the pattern conversion program 114 and the pattern analysis program 115 and determine whether an extracted pattern is identical to an original pattern.

The audio processing unit 130 provides an audio interface between the user and the electronic device 100 through a speaker 131 and a microphone 132.

The I/O controller 140 provides an interface between I/O devices, such as the display device 150 and the input unit 160, and the peripheral interface 123.

The display unit 150 displays state information of the electronic device 100, characters input by the user, moving pictures, and still pictures. For example, the display unit 150 displays information of an application program executed by the processor 122.

The input unit 160 provides input data generated by selection of the user to the processor unit 120 through the I/O controller 140. Herein, the input unit 160 may include a keypad including at least one hardware button, a touch pad for sensing touch information, and the like. For example, the input unit 160 may provide the touch information sensed through the touch pad to the processor 122 through the I/O controller 140.

In addition, the electronic device 100 further includes a communication system. The communication system may include at least one software component for performing a communication function for voice and data communication. Herein, the communication system may be classified into a plurality of communication sub-modules which support different communication networks. For example, the communication network may be, but is not limited to, any one of a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, and a Near Field Communication (NFC) network.

FIG. 2 is a block diagram illustrating detailed configuration of a processor according to one embodiment of the present disclosure.

As shown in FIGS. 1 and 2, the processor 122 includes a pattern converting unit 210, a pattern analyzing unit 220, and a display controller 230.

The pattern converting unit 210 executes the pattern conversion program 114 of the program storing unit 111 and converts an extracted pattern into a pattern of a binarized grid type. For example, as shown in FIG. 5B, the pattern converting unit 210 applies a square grid format 511 to extracted patterns 503 and 505. Herein, sizes of grids, the number of the grids, and arrangement of the grids included in the square grid format 511 may be preset by the electronic device 100 or be set by a user of the electronic device. Thereafter, as shown in FIG. 5C, the pattern converting unit 210 converts the extracted patterns 503 and 505 into first patterns 523 and 525 of a binarized grid type, respectively in consideration of sizes of the patterns 503 and 505 included in respective grids. For one example, as shown in FIG. 5B, when the extracted pattern 503 includes 50% or more of a grid 513, the pattern converting unit 210 may convert, as shown in FIG. 5C, a color of the grid 513 into the black color of a grid 515. For another example, when each of the extracted patterns 503 and 505 does not include 50% or more of a specific grid, the pattern converting unit 210 may convert a color of the corresponding grid into the white color.

The pattern analyzing unit 220 executes the pattern analysis program 115 of the program storing unit 111 and verifies pixel information about the pattern converted by the pattern converting unit 210. Herein, the pixel information may include color information of pixels, the number of the pixels, and arrangement information of the pixels. For example, the pattern analyzing unit 220 may include, as shown in FIG. 5C, 3 black pixels and 19 white pixels which are pixel information about a first horizontal row of the first pattern 525. Also, the pattern analyzing unit 220 may include 3 white pixels, 15 black pixels, and 4 white pixels which are pixel information about a $9^{th}$ horizontal row of the first pattern 523. That is, the pattern analyzing unit 220 may also verify pixel information including a sequence of pixels included in each of horizontal rows as well as the number of the pixels included in each of the horizontal rows. Also, the pattern analyzing unit 220 may also express pixel information of each of horizontal rows as a descriptor structure. Herein, the descriptor structure may include and express "<a color of a first pixel of a column (or row)>;0;[<a position of a pixel whose color is changed>;]<the number of pixels of a column (or row)><a delimiter>". Herein, it is assumed that the black color is 1 and the white color is 0. For example, the pattern analyzing unit 220 may express pixels information of the first horizontal row of the first pattern 525 and pixel information of the $9^{th}$ horizontal row of the first pattern 523 as a descriptor structure such as "1;0;4;22|0;0;4;19;22".

Also, the pattern analyzing unit 220 executes the pattern analysis program 115 of the program storing unit 111 and determines whether an extracted pattern is identical to an original pattern in consideration of a similar degree between pixels information of the extracted pattern and pixel information of the original pattern. For example, the pattern analyzing unit 220 may verify a similar degree by comparing the number of black pixels of each of horizontal rows in pixel information of the first patterns 523 and 525 with the number of black pixels of each of horizontal rows in pixel information of original patterns 533 and 535. Herein, the pattern analyzing unit 220 may also verify a similar degree by comparing pixel information about the reference number of horizontal rows among all horizontal rows of the first patterns 523 and 525 with pixel information about the reference number of horizontal rows among all horizontal rows of the original patterns 533 and 535. Thereafter, when a similar degree between pixel information of the extracted pattern and pixel information of the original pattern is greater than or equal to a reference similar degree, the pattern analyzing unit 220 may recognize that the extracted pattern is identical to the original pattern. Or, when the similar degree between the pixel information of the extracted pattern and the pixel information of the original pattern is less than the reference similar degree, the pattern analyzing unit 220 may recognize that the extracted pattern is not identical to the original pattern.

The display controller 230 executes the GUI program 113 of the program storing unit 111 and provides a UI as graphics on the display unit 150. For example, the display controller 220 controls the display unit 150 to display information of an application program executed by the processor 122.

FIG. 3 is a flowchart illustrating a process of verifying whether an extracted pattern is identical to an original pattern in an electronic device according to one embodiment of the present disclosure.

Referring to FIG. 3, the electronic device extracts a pattern in operation 301. For example, the electronic device extracts a pattern from a frame of an image or a video stream. Herein, the pattern may be a watermark included in the image or the video steam.

After, extracting the pattern, the electronic device converts the extracted pattern into a pattern of a binarized grid type in operation 303. For example, as shown in FIG. 5B, the electronic device applies a square grid format 511 to extracted patterns 503 and 505. Herein, sizes of grids, the number of the grids, and arrangement of the grids included in the square grid format 511 may be preset by the electronic device or be set by a user of the electronic device. Thereafter, as shown in FIG. 5C, the electronic device converts the extracted patterns 503 and 505 into first patterns 523 and 525 of a binarized grid type, respectively in consideration of sizes of the patterns 503 and 505 included in respective grids. For one example, as shown in FIG. 5B, when the extracted pattern 503 includes 50% or more of a grid 513, the electronic device may convert, as shown in FIG. 5C, a color of the grid 513 into the black color of a grid 515. For another example, when each of the extracted patterns 503 and 505 does not include 50% or more of a specific grid, the electronic device may convert a color of the corresponding grid into the white color.

After converting the extracted pattern into the pattern of the binarized grid type, the electronic device verifies pixel information of each of horizontal rows of the extracted pattern in operation 305. Herein, the pixel information may include color information of pixels, the number of the pixels, and arrangement information of the pixels. For example, as shown in FIG. 5C, pixel information about a first horizontal row of the first pattern 525 may include 3 black pixels and 19 white pixels. Also, pixel information about a $9^{th}$ horizontal row of the first pattern 523 may include 3 white pixels, 15 black pixels, and 4 white pixels. That is, the electronic device may also verify pixel information including a sequence of pixels included in each of horizontal rows as well as the number of the pixels included in each of the horizontal rows. Also, pixel information of each of horizontal rows may be expressed as a descriptor structure. Herein, the descriptor structure may include and express "<a color of a first pixel of a column (or row)>;0;[<a position of a pixel whose color is changed>;]<the number of pixels of a column (or row)><a delimiter>". Herein, it is assumed that the black color is 1 and the white color is 0. For example, pixels information of the first horizontal row of the first pattern 525 and pixel information of the $9^{th}$ horizontal row of the first pattern 523 may be expressed as a descriptor structure such as "1;0;4;22|0;0;4;19;22".

After verifying the pixel information of each of the horizontal rows of the extracted pattern, the electronic device verifies pixel information of each of horizontal rows of the original pattern in operation 307. For example, as shown in FIG. 3D, pixel information about a first horizontal row of an original pattern 535 may include 3 black pixels and 19 white pixels. Also, pixel information about a $9^{th}$ horizontal row of an original pattern 533 may include 3 white pixels, 16 black pixels, and 3 white pixels. That is, the electronic device may also verify pixel information including a sequence of pixels included in each of horizontal rows as well as the number of the pixels included in each of the horizontal rows. Also, pixel information of the first horizontal row of the original pattern 535 and pixel information of the $9^{th}$ horizontal row of the original pattern 533 may be expressed as a descriptor structure such as "1;0;4;22|0;0;4;20;22".

After verifying the pixel information of each of the horizontal rows of the original pattern, the electronic device determines whether the extracted pattern is identical to the original pattern in consideration of a similar degree between the pixels information of the extracted pattern and the pixel information of the original pattern in operation 309. For example, the electronic device may verify a similar degree by comparing the number of black pixels of each of horizontal rows in the pixel information of the first patterns 523 and 525, which is verified in operation 305, with the number of black pixels of each of horizontal rows in the pixel information of the original patterns 533 and 535, which is verified in operation 307. Herein, the electronic device may also verify a similar degree by comparing pixel information of the reference number of horizontal rows among all horizontal rows of the first patterns 523 and 525 with pixel information of the reference number of horizontal rows among all horizontal rows of the original patterns 533 and 535. Thereafter, when a similar degree between pixel information of the extracted pattern and pixel information of the original pattern is greater than or equal to a reference similar degree, the electronic device may recognize that the extracted pattern is identical to the original pattern. Or, when the similar degree between the pixel information of the extracted pattern and the pixel information of the original pattern is less than the reference similar degree, the electronic device may recognize that the extracted pattern is not identical to the original pattern.

Thereafter, the electronic device ends the algorithm of FIG. 3.

Figure 4:
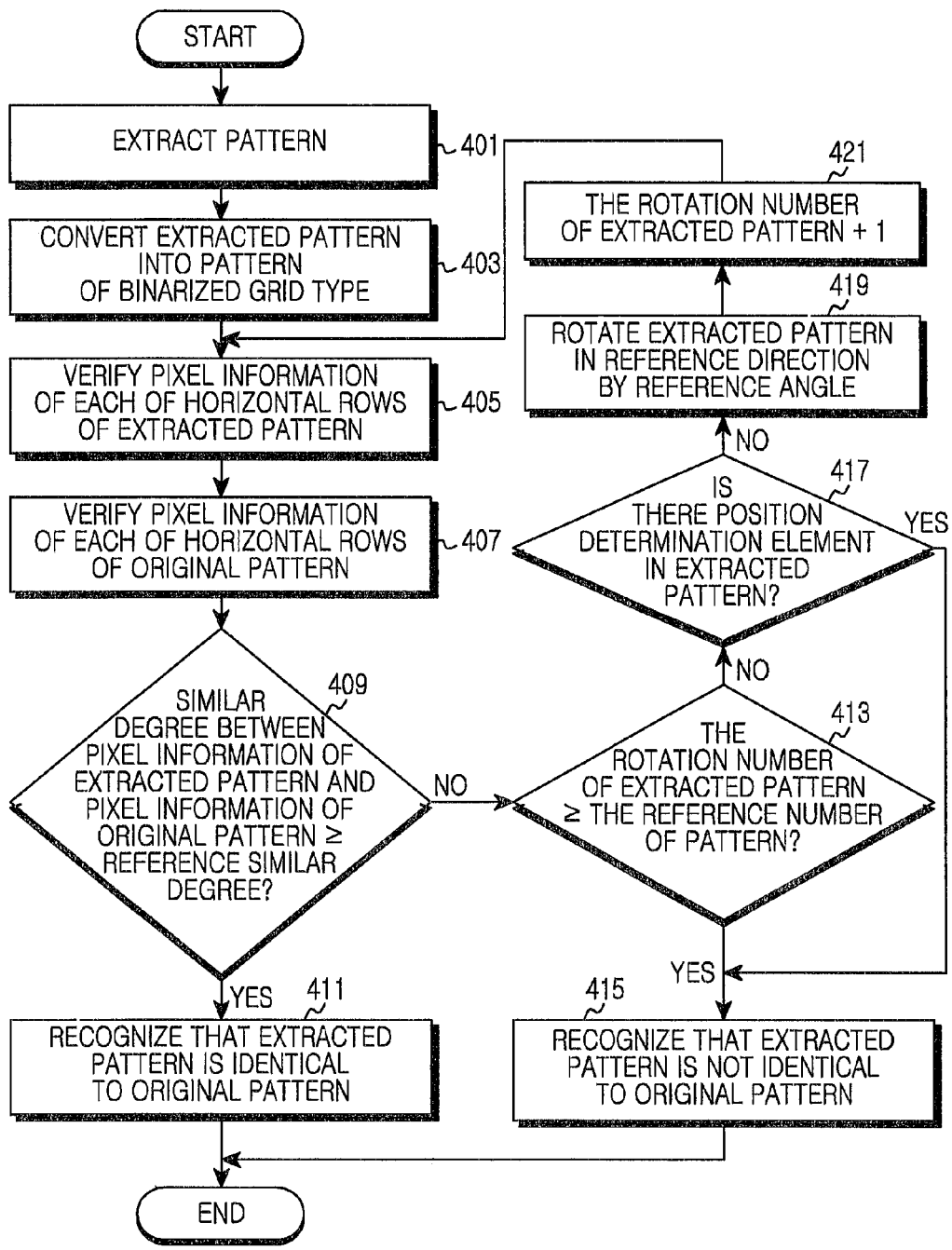
FIG. 4 is a flowchart illustrating a process of verifying whether an extracted pattern is identical to an original pattern in an electronic device according to another embodiment of the present disclosure.

FIG. 4 is a flowchart illustrating a process of verifying whether an extracted pattern is identical to an original pattern in an electronic device according to another embodiment of the present disclosure.

Referring to FIG. 4, the electronic device extracts a pattern in operation 401. For example, the electronic device extracts a pattern from a frame of an image or a video stream. Herein, the pattern may include a watermark.

Figure 6A:
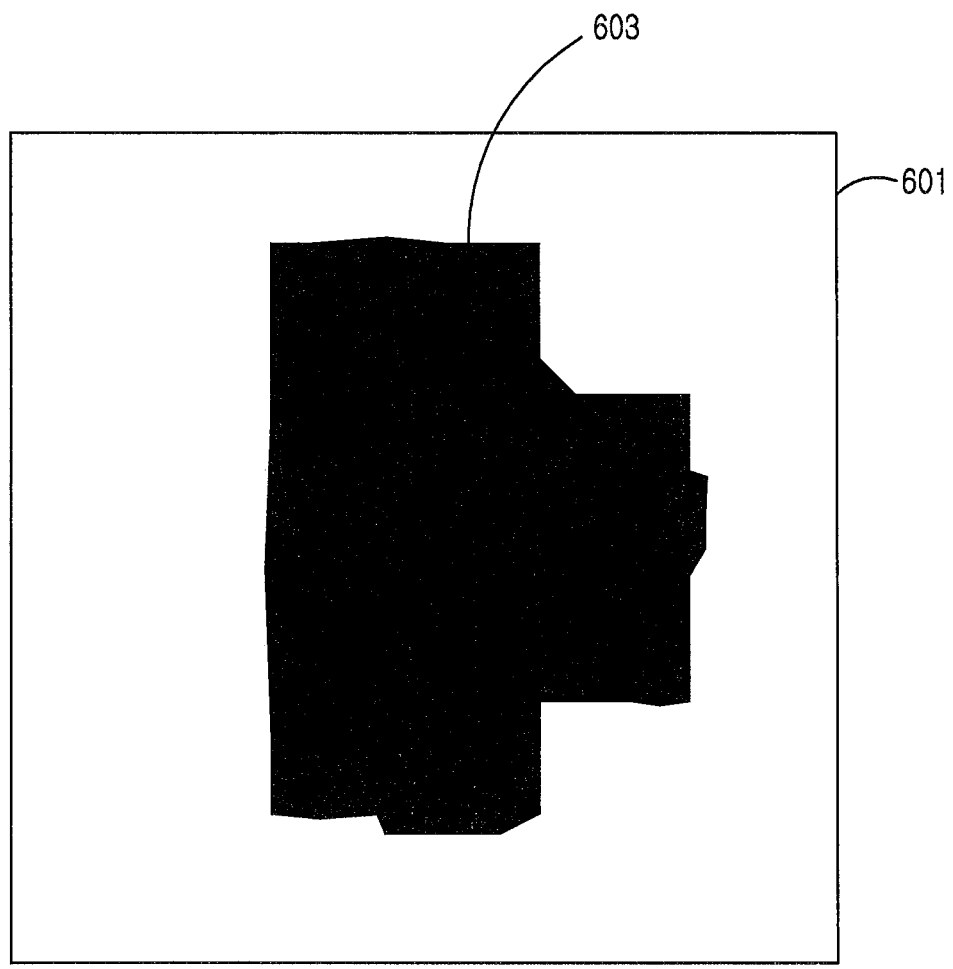
FIGS. 6A to 6G illustrate patterns, each of them not including a position determination element in an electronic device according to one embodiment of the present disclosure.
Figure 6B:
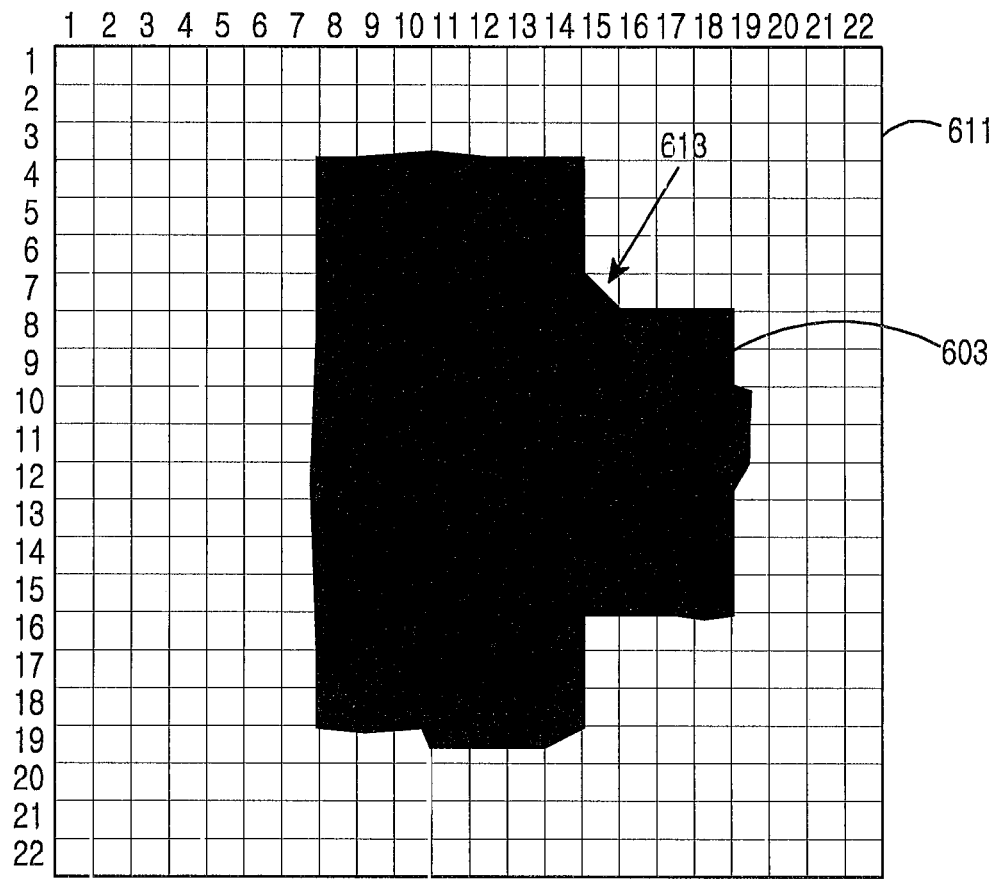
Figure 6C:
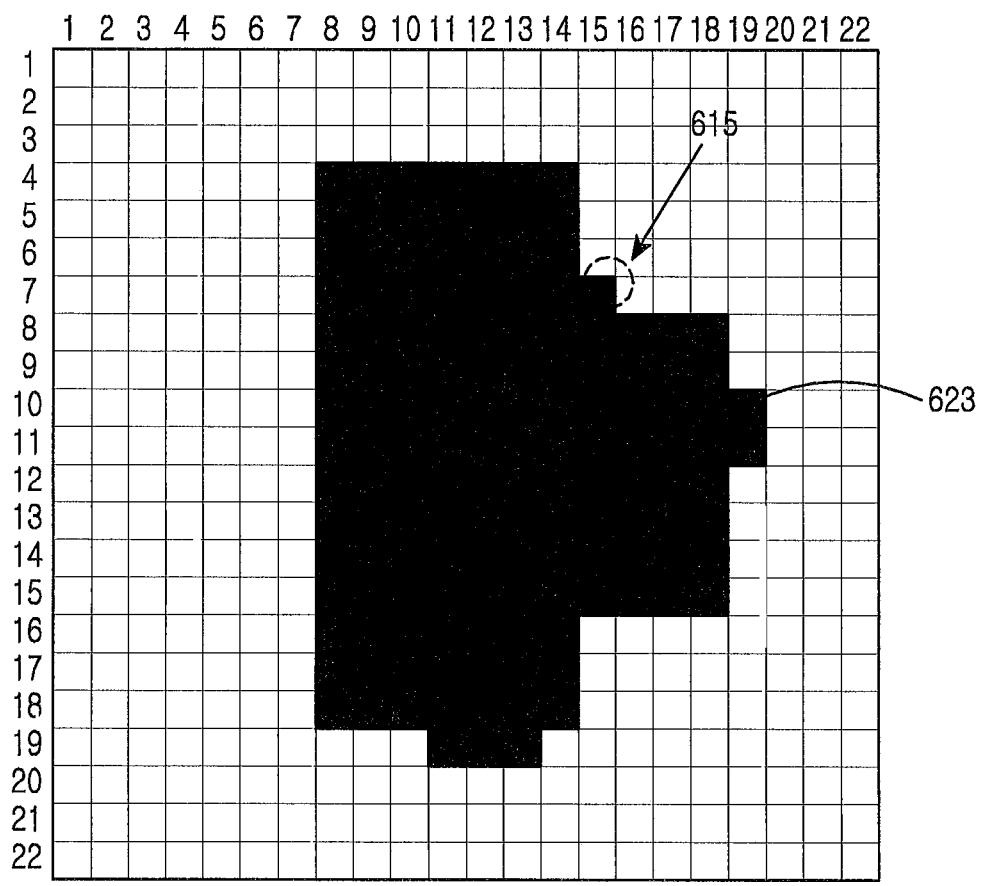
Figure 6D:
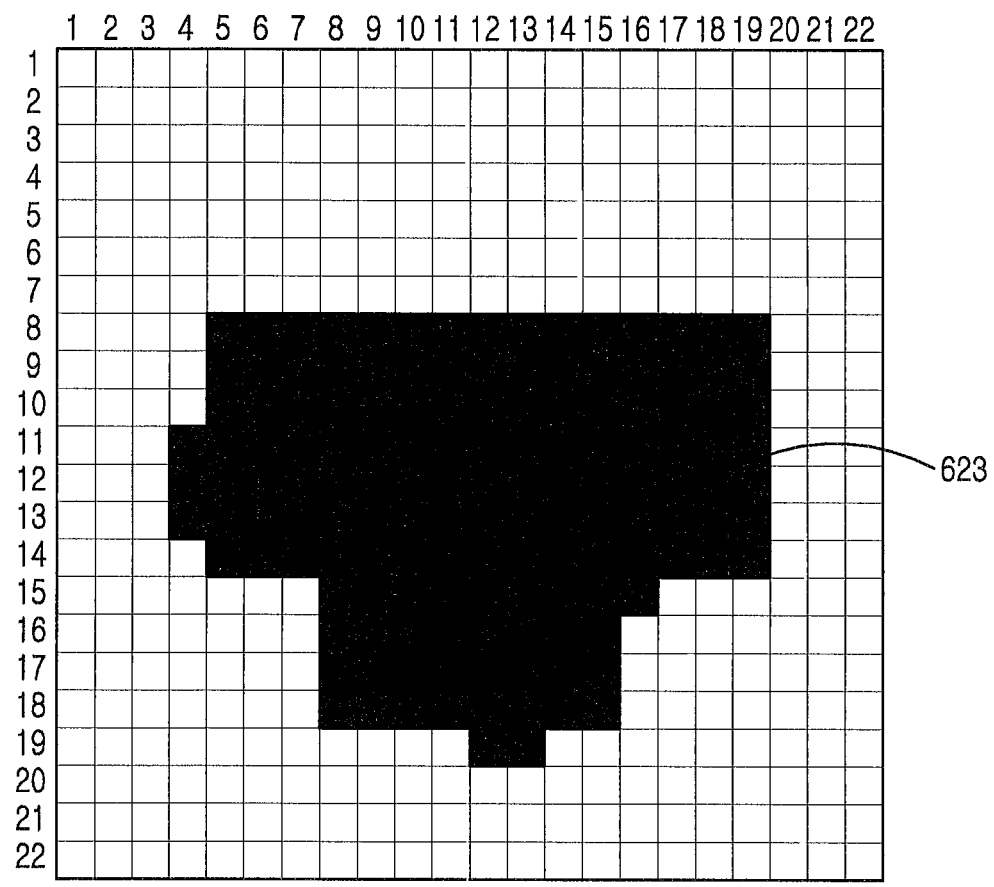
Figure 6E:
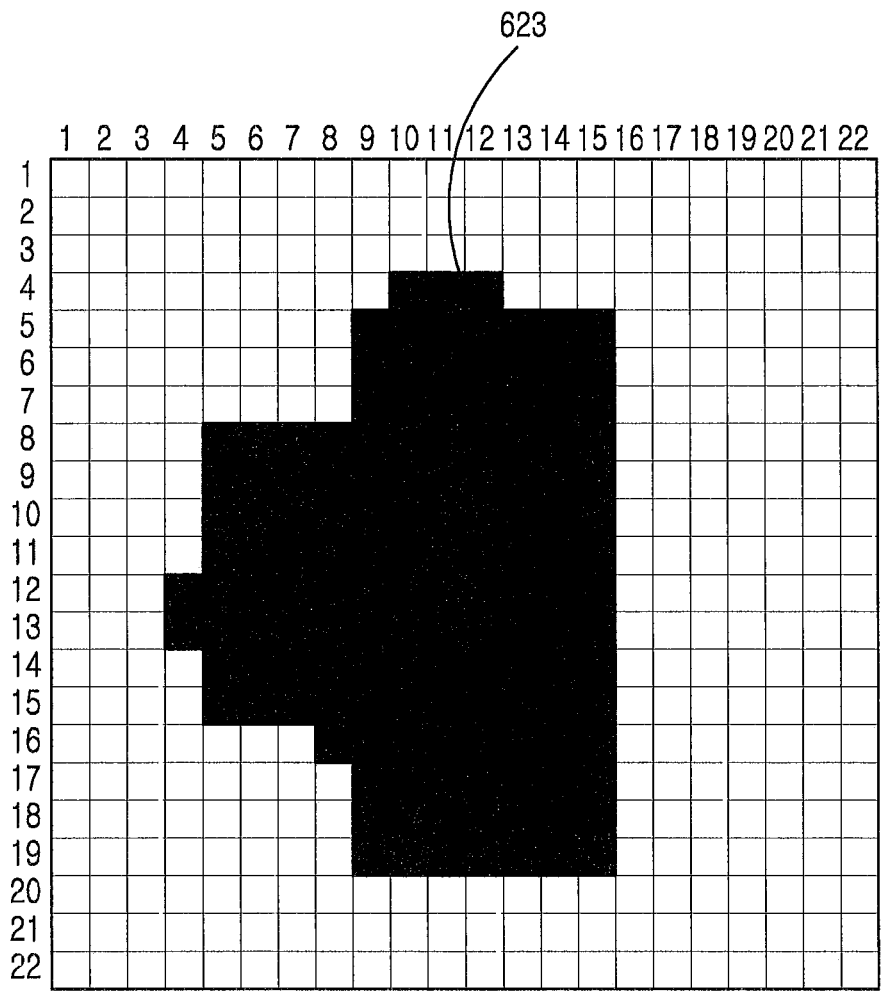
Figure 6F:
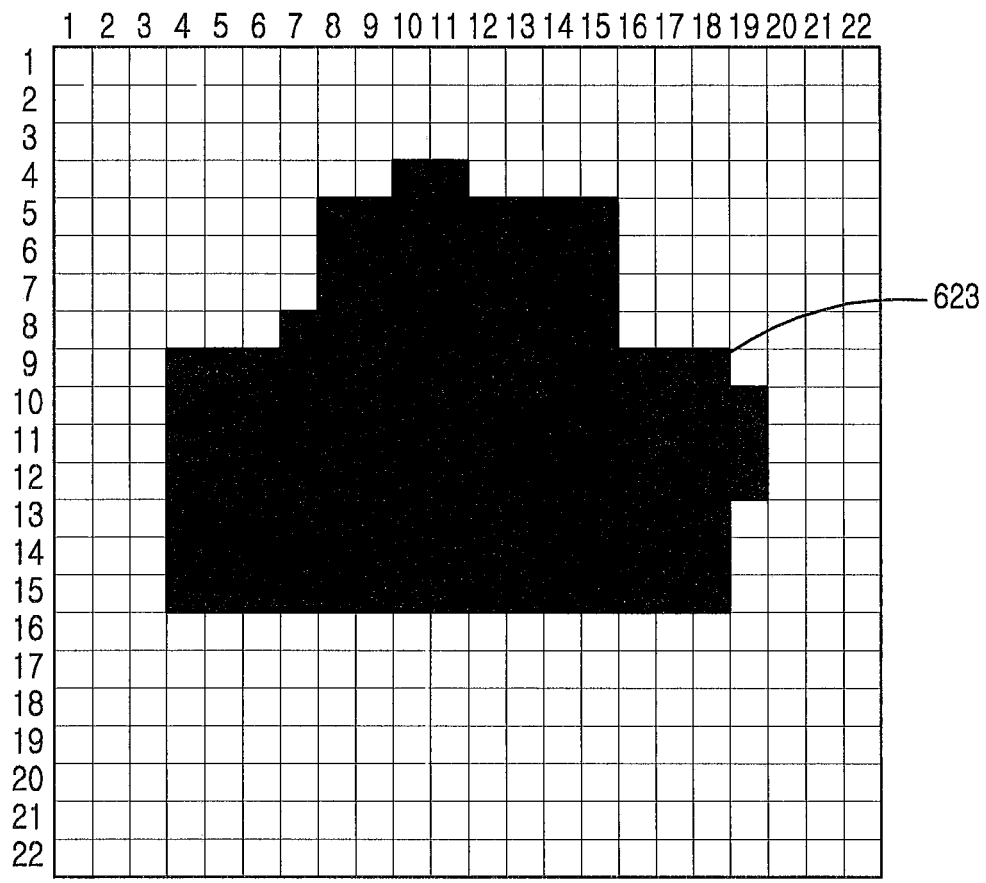

After, extracting the pattern, the electronic device converts the extracted pattern into a pattern of a binarized grid type in operation 403. For example, as shown in FIG. 6B, the electronic device applies a square grid format 611 to extracted patterns 603. Herein, sizes of grids, the number of the grids, and arrangement of the grids included in the square grid format 611 may be preset by the electronic device or be set by a user of the electronic device. Thereafter, as shown in FIG. 6C, the electronic device converts the extracted patterns 603 into a second pattern 623 of a binarized grid type in consideration of a size of the pattern 603 included in respective grids. For one example, as shown in FIG. 6B, when the extracted pattern 603 includes 50% or more of a grid 613, the electronic device may convert, as shown in FIG. 6C, a color of the grid 613 into the black color of a grid 615. For another example, when the extracted pattern 603 does not include 50% or more of a specific grid, the electronic device may convert a color of the corresponding grid into the white color.

After converting the extracted pattern into the pattern of the binarized grid type, the electronic device verifies pixel information of each of horizontal rows of the extracted pattern in operation 405. Herein, the pixel information may include color information of pixels, the number of the pixels, and arrangement information of the pixels. For example, as shown in FIG. 6C, pixel information about a 4$^{th}$ horizontal row of the second pattern 623 may include 7 black pixels and 15 white pixels. Also, pixel information about a 5$^{th}$ horizontal row of the second pattern 623 may include 7 white pixels, 7 black pixels, and 8 white pixels. That is, the electronic device may also verify pixel information including a sequence of pixels included in each of horizontal rows as well as the number of the pixels included in each of the horizontal rows. Also, pixel information of each of horizontal rows may be expressed as a descriptor structure. Herein, the descriptor structure may include and express "<a color of a first pixel of a column (or row)>;0;[<a position of a pixel whose color is changed>;]<the number of pixels of a column (or row)><a delimiter>". Herein, it is assumed that the black color is 1 and the white color is 0. For example, pixels information of the 5$^{th}$ horizontal row and a 10$^{th}$ horizontal row of the second pattern 623 may be expressed as a descriptor structure such as "0;0;8;15;22|0;0;8;20;22".

Figure 6G:
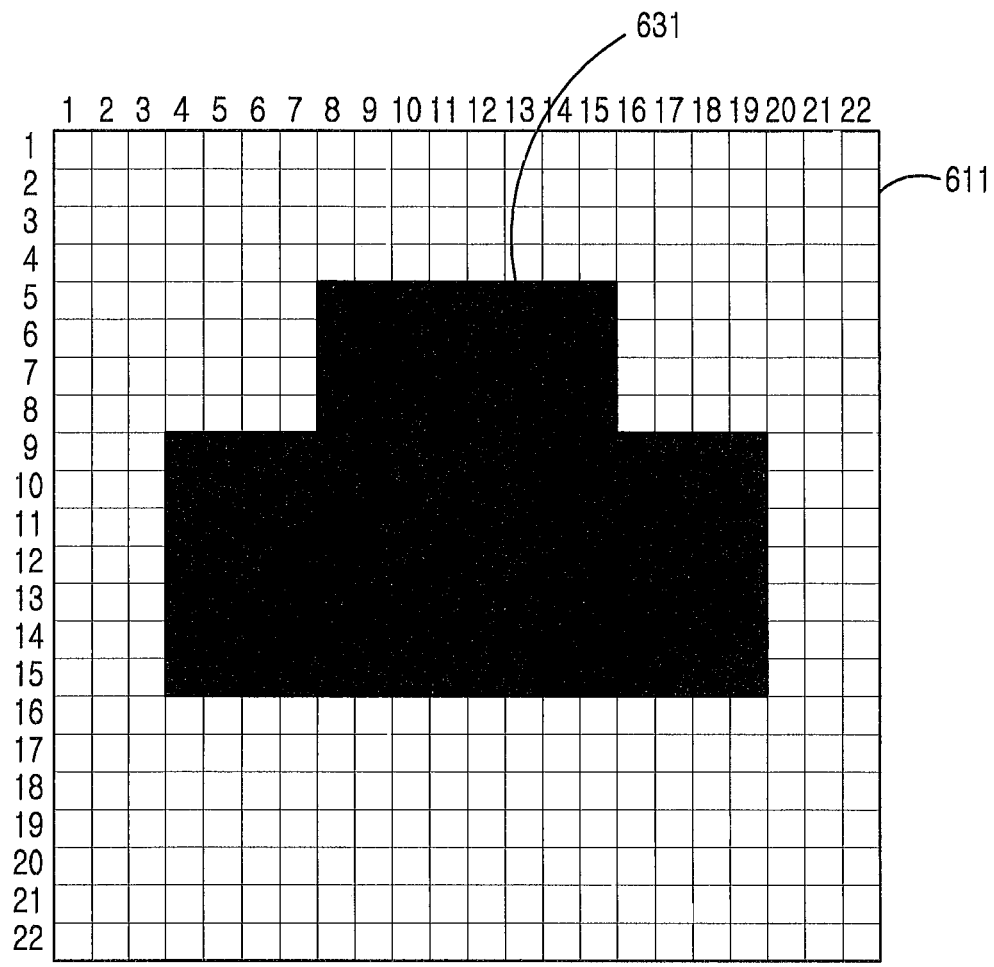

After verifying the pixel information of each of the horizontal rows of the extracted pattern, the electronic device verifies pixel information of each of horizontal rows of the original pattern in operation 407. For example, as shown in FIG. 6G, pixel information about a 5$^{th}$ horizontal row of an original pattern 631 may include 8 black pixels and 14 white pixels. Also, pixel information about the 5$^{th}$ horizontal row of the original pattern 631 may include 7 white pixels, 8 black pixels, and 7 white pixels. That is, the electronic device may also verify pixel information including a sequence of pixels included in each of horizontal rows as well as the number of the pixels included in each of the horizontal rows. Also, pixel information of the 5$^{th}$ horizontal row or a 10$^{th}$ horizontal row of the original pattern 631 may be expressed as a descriptor structure such as "0;0;8;16;22|0;0;4;20;22".

After verifying the pixel information of each of the horizontal rows of the original pattern, the electronic device verifies whether a similar degree between the pixel information of the extracted pattern and the pixel information of the original pattern is greater than or equal to a reference similar degree in operation 409. For example, the electronic device verifies a similar degree by comparing the number of the total pixels of each color in the pixel information of the second pattern 623, which is verified in operation 405, with the number of the total pixels of each color in the pixel information of the original pattern 631, which is verified in operation 407. Herein, the electronic device may also verify a similar degree by comparing pixel information about the reference number of horizontal rows among all horizontal rows of the second pattern 623 with pixel information about the reference number of horizontal rows among all horizontal rows of the original pattern 631.

If the similar degree between the pixel information of the extracted pattern and the pixel information of the original pattern is greater than or equal to the reference similar degree, the electronic device recognizes that the extracted pattern is identical to the original pattern in operation 411. For example, difference between the number of black pixels of each of horizontal rows of the second pattern 623 and the number of black pixels of each of horizontal rows of the original pattern 631 is less than the reference number of pixels; the electronic device may recognize that the extracted pattern is identical to the original pattern. When it is recognized that that the extracted pattern is identical to the original pattern, the electronic device may ends the algorithm of FIG. 4.

Alternatively, when the similar degree between the pixel information of the extracted pattern and the pixel information of the original pattern is less than the reference similar degree, the electronic device recognizes that there is a position determination element in the extracted pattern in operation 413. For example, the difference between the number of the black pixels of each of the horizontal rows of the second pattern 623 and the number of the black pixels of each of the horizontal rows of the original pattern 631 is greater than or equal to the reference number of pixels, the electronic device verifies that there is the position determination element in the second pattern 623. Herein, the position determination element is to determine whether to rotate a pattern using a pixel of a previously defined size in a previously defined position (e.g., a left upper end).

If there is the position determination element in the extracted pattern, the electronic device recognizes that the extracted pattern is not identical to the original pattern in operation 415. For example, when there is the position determination element in the extracted pattern, the electronic device may recognize that a pattern is not rotated and recognize that the extracted pattern is not identical to the original pattern. When it is recognized that the extracted pattern is not identical to the original pattern, the electronic device may end the algorithm of FIG. 4.

Alternatively, when there is no position determination element in the extracted pattern, the electronic device verifies whether the rotation number of the extracted pattern is greater than or equal to the reference number of a pattern in operation 417. For example, when there is no position determination element in the extracted pattern, the electronic device may rotate the extracted pattern and verify whether the rotated pattern is identical to the original pattern again.

If the rotation number of the extracted pattern is greater than or equal to the reference number of the pattern, the electronic device recognizes that the extracted pattern is not identical to the original pattern in operation 415. For example, when the rotation number of the extracted pattern is greater than or equal to the reference number of the pattern, the electronic device may recognize that it previously rotated the extracted pattern and determine whether the rotated pattern is identical to the original pattern. Accordingly, the electronic device may recognize that the extracted pattern is not identical to the original pattern.

Alternatively, when the rotation number of the extracted pattern is less than the reference number of the pattern, the electronic device rotates the extracted pattern in a reference direction by a reference angle in operation 419. For one example, the electronic device may display the second pattern 623 shown in FIG. 6D by rotating the second pattern 623 shown in FIG. 6C clockwise at 90 degrees. For another example, the electronic device may display the second pattern 623 shown in FIG. 6E by rotating the second pattern 623 shown in FIG. 6D clockwise at 90 degrees. For another example, the electronic device may display the second pattern 623 shown in FIG. 6F by rotating the second pattern 623 shown in FIG. 6E clockwise at 90 degrees.

After rotating the extracted pattern in the reference direction by the reference angle, the electronic device updates the rotation number of the extracted pattern by adding 1 to the rotation number of the extracted pattern. For example, when the extracted pattern is first rotated, the electronic device updates the rotation number of the extracted pattern to 1 by adding 1 to the rotation number of the extracted pattern. When the extracted pattern is additionally rotated in a state where it is rotated once, the electronic device may update the rotation number of the extracted pattern to 2 by adding 1 to the rotation number of the extracted pattern.

After updating the rotation number of the extracted pattern by adding 1 to the rotation number of the extracted pattern, the electronic device verifies pixel information of each of horizontal rows of the extracted pattern which is rotated in the reference direction by the reference angle. For example, the electronic device performs the processing from operation 405.

As described above, the electronic device compares the pixel information of the extracted pattern with the pixel information of the original pattern and determines whether the extracted pattern is identical to the original pattern. If it is determined that the extracted pattern is identical to the original pattern, the electronic device may perform a control operation to correct pixels of an incorrectly extracted portion of the extracted pattern using the pixel information of the original pattern.

As described above, there is an advantage in that the electronic device enhances a speed for verifying the extracted pattern is identical to the original pattern by converting the pattern extracted from the image or the video frame into the pattern of the binarized grid type and verifying the similar degree between the converted pattern and the original pattern.

It will be appreciated that embodiments of the present disclosure according to the claims and description in the specification may be realized in the form of hardware, software or a combination of the hardware and the software.

Any such software may be stored in a computer readable storage medium. The computer readable storage medium stores one or more programs (software modules), each of the one or more programs comprising instructions, which when executed by the one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of a memory such as, for example, a RAM, memory chips, a device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising codes for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been particularly shown and described with reference to example embodiments thereof, it will be understood by those skilled in the art that various changes in form and details may be made therein without departing from the spirit and scope of the present disclosure as defined by the appended claims.

What is claimed is:

1. A method in an electronic device, the method comprising:
    extracting a pattern from an image;
    converting the extracted pattern into a first pattern of a binarized grid type based on a size of the extracted pattern and a size of respective grids;
    verifying pixel information of the first pattern as a descriptor structure to include a color of a first pixel of a horizontal row or vertical column, a position of a pixel whose color is changed, the number of pixels of the horizontal row or vertical column, and a delimiter; and
    determining whether the first pattern is identical to an original pattern based on a similar degree between the descriptor structure of the first pattern and descriptor structure of the original pattern.

2. The method of claim 1, wherein the pixel information includes color information of pixels, the number of the pixels, and arrangement information of the pixels included in at least one horizontal row or vertical column.

3. The method of claim 1, wherein the determination whether the extracted pattern is identical to the original pattern comprises comparing pixel information about a reference number of horizontal rows or vertical columns among all horizontal rows or vertical columns of the first pattern with pixel information about the reference number of horizontal rows or vertical columns among all horizontal rows or vertical columns of the original pattern and determining whether the first pattern is identical to the original pattern.

4. The method of claim 1, wherein the determination whether the extracted pattern is identical to the original pattern comprises:
    comparing pixel information about each of horizontal rows or vertical columns of the first pattern with pixel information about each of horizontal rows or vertical columns of the original pattern; and
    determining that the first pattern is identical to the original pattern when the number of horizontal rows or vertical columns comprising a reference similar degree or more is greater than or equal to a reference number of horizontal rows or vertical columns among each of horizontal rows or vertical columns of the first pattern and the original pattern.

5. The method of claim 1, further comprising verifying whether there is a position determination element in the first pattern in response to a determination that the first pattern is not identical to the original pattern.

6. The method of claim 5, wherein verifying whether there is the position determination element comprises verifying whether there are pixels of a previously defined size in a previously defined position of the first pattern.

7. The method of claim 6, further comprising rotating the first pattern at a previously defined angle in a previously defined direction when the position determination element is not in the first pattern.

8. The method of claim 7, further comprising determining whether the rotated first pattern is identical to the original pattern based on a similar degree between pixel information of the rotated first pattern and the pixel information of the original pattern.

9. An electronic device comprising:
    at least one processor; and
    at least one memory,
    wherein at least the one processor is configured to extract a pattern from an image, convert the extracted pattern into a first pattern of a binarized grid type based on a size of the extracted pattern and a size of respective grids, verify pixel information of the first pattern as a descriptor structure to include a color of a first pixel of a horizontal row or vertical column, a position of a pixel whose color is changed, the number of pixels of the horizontal row or vertical column, and a delimiter, and determine whether the first pattern is identical to an original pattern based on a similar degree between the descriptor structure of the first pattern and descriptor structure of the original pattern.

10. The electronic device of claim 9, wherein the pixel information includes color information of pixels, the number of the pixels, and arrangement information of the pixels included in at least one horizontal row or vertical column.

11. The electronic device of claim 9, wherein at least the one processor is further configured to compare pixel information about a reference number of horizontal rows or vertical columns among all horizontal rows or vertical columns of the first pattern with pixel information about the reference number of horizontal rows or vertical columns among all horizontal rows or vertical columns of the original pattern and determines whether the first pattern is identical to the original pattern.

12. The electronic device of claim 9, wherein at least the one processor is further configured to compare pixel information about each of horizontal rows or vertical columns of the first pattern with pixel information about each of horizontal rows or vertical columns of the original pattern and determines that the first pattern is identical to the original pattern when the number of horizontal rows or vertical columns comprising a reference similar degree or more is greater than or equal to a reference number of horizontal rows or vertical columns among each of horizontal rows or vertical columns of the first pattern and the original pattern.

13. The electronic device of claim 9, wherein at least the one processor is further configured to verify whether there is a position determination element in the first pattern in response to a determination that the first pattern is not identical to the original pattern.

14. The electronic device of claim 13, wherein at least the one processor is further configured to verify whether there are pixels of a previously defined size in a previously defined position of the first pattern and verify whether there is the position determination element in the first pattern.

15. The electronic device of claim 14, wherein at least the one processor is further configured to rotate the first pattern at a previously defined angle in a previously defined direction when the position determination element is not in the first pattern.

16. The electronic device of claim 15, wherein at least the one processor is further configured to determine whether the rotated first pattern is identical to the original pattern based on a similar degree between pixel information of the rotated first pattern and the pixel information of the original pattern.

17. A non-transitory computer-readable storage medium encoded with computer-executable instructions that when executed cause a data processing system to perform the steps of:
   extracting a pattern from an image;
   converting the extracted pattern into a first pattern of a binarized grid type based on a size of the extracted pattern and a size of respective grids;
   verifying pixel information of the first pattern as a descriptor structure to include a color of a first pixel of a horizontal row or vertical column, a position of a pixel whose color is changed, the number of pixels of the horizontal row or vertical column, and a delimiter; and
   determining whether the first pattern is identical to an original pattern based on a similar degree between the descriptor structure of the first pattern and descriptor structure of the original pattern.

18. The computer-readable storage medium of claim 17, wherein the pixel information includes color information of pixels, the number of the pixels, and arrangement information of the pixels included in at least one horizontal row or vertical column.

* * * * *